(12) United States Patent
Shirooka

(10) Patent No.: US 9,650,074 B2
(45) Date of Patent: May 16, 2017

(54) VEHICLE FRONT PORTION STRUCTURE

(71) Applicant: TOYOTA JIDOSHA KABUSHIKI KAISHA, Toyota-shi, Aichi-ken (JP)

(72) Inventor: Masakazu Shirooka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/771,296

(22) PCT Filed: Feb. 25, 2014

(86) PCT No.: PCT/JP2014/054577
§ 371 (c)(1),
(2) Date: Aug. 28, 2015

(87) PCT Pub. No.: WO2014/167902
PCT Pub. Date: Oct. 16, 2014

(65) Prior Publication Data
US 2016/0016611 A1    Jan. 21, 2016

(30) Foreign Application Priority Data
Apr. 9, 2013 (JP) .................................. 2013-081390

(51) Int. Cl.
| B62D 21/15 | (2006.01) |
| B62D 21/11 | (2006.01) |
| B62D 25/08 | (2006.01) |

(52) U.S. Cl.
CPC ............ B62D 21/152 (2013.01); B62D 21/11 (2013.01); B62D 21/155 (2013.01); B62D 25/082 (2013.01)

(58) Field of Classification Search
CPC ...... B62D 21/15; B62D 21/11; B62D 21/155; B62D 21/152; B62D 25/082
See application file for complete search history.

(56) References Cited

U.S. PATENT DOCUMENTS

| 8,490,988 B2 * | 7/2013 | Takeshita ............. B62D 21/155 280/124.109 |
| 2004/0145216 A1 | 7/2004 | Kuroda et al. |
| 2011/0198889 A1 | 8/2011 | Takeshita et al. |
| 2015/0061272 A1 | 3/2015 | Watanabe et al. |
| 2015/0137558 A1 | 5/2015 | Ayuzawa et al. |

FOREIGN PATENT DOCUMENTS

| JP | S61-120603 U | 7/1986 |
| JP | 2004-217108 A | 8/2004 |
| JP | 2005-329821 A | 12/2005 |

(Continued)

*Primary Examiner* — Glenn Dayoan
*Assistant Examiner* — Melissa A Black
(74) *Attorney, Agent, or Firm* — Oliff PLC

(57) ABSTRACT

A vehicle front portion structure has: front side members that are disposed along a vehicle body longitudinal direction, and that have inclined portions that cause vehicle body front portion sides to be positioned higher than vehicle body rear portion sides; and a suspension member that is disposed at a vehicle body front side of the inclined portions, and that has inclined walls whose angle of inclination is made to be smaller than an angle of inclination of the inclined portions, the inclined wall being formed at regions that face the inclined portions, in a side view seen from a vehicle transverse direction.

8 Claims, 9 Drawing Sheets

(56) References Cited

FOREIGN PATENT DOCUMENTS

| | | |
|---|---|---|
| JP | 2007-137243 A | 6/2007 |
| JP | 2011-162159 A | 8/2011 |
| JP | 2012-206653 A | 10/2012 |
| JP | 2014-000837 A | 1/2014 |
| WO | 2013/172126 A1 | 11/2013 |

* cited by examiner

VEHICLE FRONT PORTION STRUCTURE

TECHNICAL FIELD

The present invention relates to a vehicle front portion structure.

BACKGROUND ART

There is conventionally known a structure in which the rear end portion of a sub-frame and a front side frame are joined by a stay, and, at the time of a frontal collision of the vehicle, the collision load is absorbed by deforming the stay (see, for example, Japanese Patent Application Laid-Open (JP-A) No. 2012-206653).

SUMMARY OF INVENTION

Technical Problem

However, the above-described structure is not a structure in which the sub-frame is made to separate from the front side frame merely due to the stay deforming. Therefore, there is the concern that the sub-frame (the suspension member) will be nipped between the power unit and the front side frame (the front side member). Namely, there is room for improvement in order to efficiently absorb the collision load that is inputted to the sub-frame from the vehicle body front side.

Thus, an object of the present invention is to obtain a vehicle front portion structure that can efficiently absorb collision impact that is inputted from a vehicle front side to a suspension member.

Solution to Problem

In order to achieve the above-described object, a vehicle front portion structure of a first aspect relating to the present invention comprises: front side members that are disposed along a vehicle body longitudinal direction, and that have inclined portions that cause vehicle body front portion sides to be positioned higher than vehicle body rear portion sides; and a suspension member that is disposed at a vehicle body front side of the inclined portions, and that has inclined walls whose angle of inclination is made to be smaller than an angle of inclination of the inclined portions, the inclined walls being formed at regions that face the inclined portions, in a side view seen from a vehicle transverse direction.

In accordance with the first aspect, in a side view seen from the vehicle transverse direction, the angle of inclination of the inclined walls that are formed at the suspension member is made to be smaller than the angle of inclination of the inclined portions at the front side members. Accordingly, when collision load is inputted from the vehicle body front side and the suspension member moves rearward, it is easy for the inclined walls to move toward the vehicle body rear lower side while being guided by the inclined portions. Namely, the suspension member is moved so as to enter in toward the vehicle body lower sides of the front side members, while interference with the front side members is suppressed. Accordingly, the collision load that is inputted from the vehicle body front side to the suspension member is absorbed efficiently.

Further, a vehicle front portion structure of a second aspect relating to the present invention is the vehicle front portion structure of the first aspect, wherein concave portions, that have inclined surfaces that are directed toward a vehicle body front upper side, are formed at lower surface sides of the inclined portions, and an angle of inclination of the inclined surfaces is made to be larger than the angle of inclination of the inclined walls, in a side view seen from the vehicle transverse direction.

In accordance with the second aspect, the angle of inclination of the inclined surfaces, that are directed toward the vehicle body front upper side, of the concave portions that are formed at the lower surface sides of the inclined portions is made to be greater than the angle of inclination of the inclined walls, in a side view seen from the vehicle transverse direction. Accordingly, when collision load is inputted from the vehicle body front side and the suspension member moves rearward, the inclined walls are moved toward the vehicle body rear lower side while being guided by the inclined surfaces. Namely, the suspension member is moved so as to enter in toward the vehicle body lower sides of the front side members, while interference with front side members is additionally suppressed. Accordingly, the collision load that is inputted from the vehicle body front side to the suspension member is absorbed more efficiently.

Further, a vehicle front portion structure of a third aspect relating to the present invention comprises: front side members that are disposed along a vehicle body longitudinal direction, and that have inclined portions that cause vehicle body front portion sides to be positioned higher than vehicle body rear portion sides, concave portions, that have inclined surfaces that are directed toward a vehicle body front upper side, being formed at lower surface sides of the inclined portions; and a suspension member that is disposed at a vehicle body front side of the inclined portions, and that has inclined walls whose angle of inclination is made to be smaller than an angle of inclination of the inclined surfaces at the concave portions, the inclined walls being formed at regions that face the inclined surfaces, in a side view seen from a vehicle transverse direction.

In accordance with the third aspect, in a side view seen from the vehicle transverse direction, the angle of inclination of the inclined walls that are formed at the suspension members is made to be smaller than the angle of inclination of the inclined surfaces of the concave portions that are formed at the front side members. Accordingly, when collision load is inputted from the vehicle body front side and the suspension member moves rearward, it is easy for the inclined walls to move toward the vehicle body rear lower side while being guided by the inclined surfaces. Namely, the suspension member is moved so as to enter in toward the vehicle body lower sides of the front side members, while interference with front side members is suppressed. Accordingly, the collision load that is inputted from the vehicle body front side to the suspension member is absorbed efficiently.

Further, a vehicle front portion structure of a fourth aspect relating to the present invention is the vehicle front portion structure of any of the first through third aspects, wherein the suspension member has fastening portions that extend integrally from rear end portions of the inclined walls toward a vehicle body rear side, and that are fastened to lower end portions of the inclined portions.

In accordance with the fourth aspect, the fastening portions, that are fastened to the lower end portions of the inclined portions, extend integrally toward the vehicle body rear side from rear end portions of the inclined walls of the suspension members. Accordingly, as compared with a structure in which fastening portions are provided separately from the suspension members, assembling of the suspension members is easy, and a reduction in the manufacturing costs is devised.

Further, a vehicle front portion structure of a fifth aspect relating to the present invention is the vehicle front portion structure of the fourth aspect, wherein the fastening portions are formed in flat plate shapes that is configured to bendingly deform toward a vehicle body lower side when collision load is inputted from a vehicle body front side.

In accordance with the fifth aspect, when collision load is inputted from the vehicle body front side to the suspension members, the fastening portions that are flat plate shaped bendingly deform toward the vehicle body lower side. Accordingly, the collision load that is inputted from the vehicle body front side to the suspension member is absorbed efficiently. Note that "flat plate shaped" in the present invention also includes, for example, substantial flat plate shapes whose peripheral edge portions are molded so as to bend toward the vehicle body lower side.

Further, a vehicle front portion structure of a sixth aspect relating to the present invention is the vehicle front portion structure of the fourth or fifth aspect, wherein cap nuts are fixed to the lower end portions of the inclined portions, and the fastening portions are fastened to the lower end portions due to bolts, that are inserted-through through-holes formed at the fastening portions, being screwed-together with the cap nuts.

In accordance with the sixth aspect, the cap nuts, with which bolts that fasten the fastening portions are screwed-together, are fixed to the lower end portions of the inclined portions. Namely, the fastening strength of the fastening portions to the lower end portions of the inclined portions is increased. Accordingly, when collision load is inputted from the vehicle body front side to the suspension members, stress concentrates around the through-holes of the fastening portions, and these peripheries of the through-holes break. Due thereto, the suspension members separate from the lower end portions of the inclined portions, and are moved so as to deeply enter in toward the vehicle body lower sides of the front side members. Therefore, the collision load that is inputted from the vehicle body front side to the suspension member is absorbed more efficiently.

Advantageous Effects of Invention

As described above, in accordance with the first aspect relating to the present invention, collision load that is inputted from the vehicle body front side to the suspension members can be absorbed efficiently.

In accordance with the second aspect relating to the present invention, collision load that is inputted from the vehicle body front side to the suspension members can be absorbed more efficiently.

In accordance with the third aspect relating to the present invention, collision load that is inputted from the vehicle body front side to the suspension members can be absorbed efficiently.

In accordance with the fourth aspect relating to the present invention, the suspension members can be assembled easily and a reduction in the manufacturing costs can be devised, as compared with a structure in which the fastening portions are provided separately from the suspension members.

In accordance with the fifth aspect relating to the present invention, collision load that is inputted from the vehicle body front side to the suspension members can be absorbed efficiently.

In accordance with the sixth aspect relating to the present invention, collision load that is inputted from the vehicle body front side to the suspension members can be absorbed more efficiently.

DESCRIPTION OF EMBODIMENTS

Embodiments relating to the present invention are described in detail hereinafter on the basis of the drawings. Note that, for convenience of explanation, arrow UP that is shown appropriately in the respective drawings is the vehicle body upward direction, arrow FR is the vehicle body frontward direction, and arrow OUT is the vehicle transverse direction outer side. Further, in the following description, when vertical, longitudinal, and left-right directions are used, they mean the vertical of the vehicle body vertical direction, the longitudinal of the vehicle body longitudinal direction, and the left and right of the vehicle body left-right direction (the vehicle transverse direction), unless otherwise indicated.

First Embodiment

Figure 2:
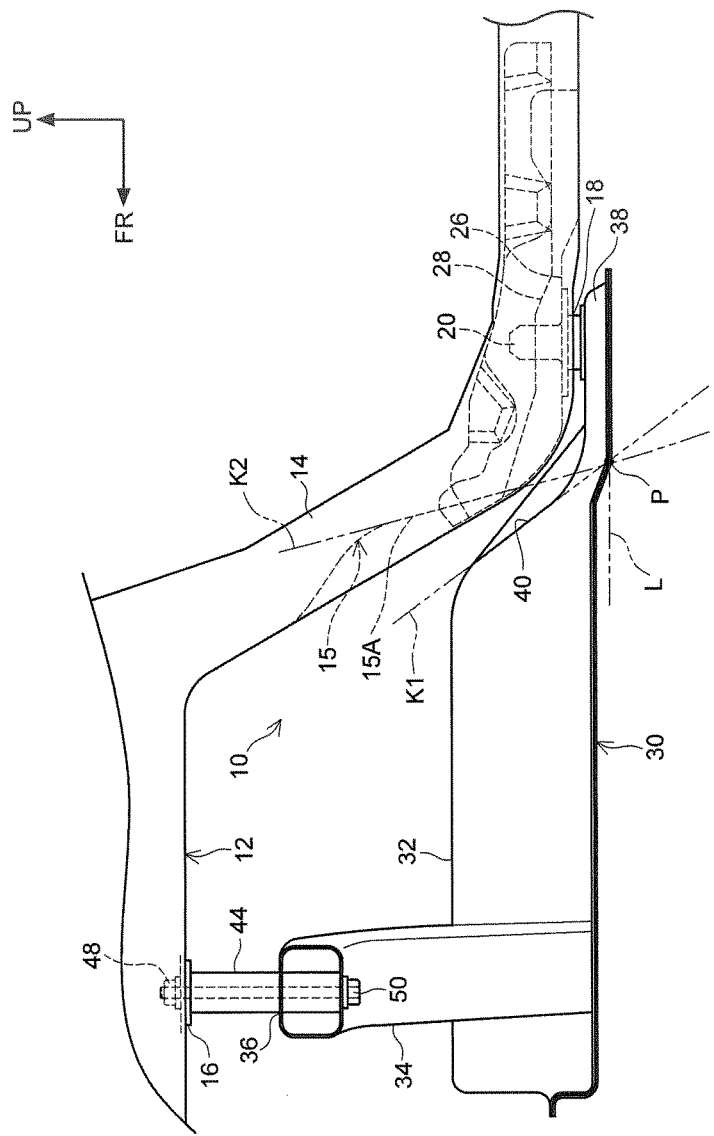
FIG. 2 is a side view showing the vehicle front portion structure relating to the first embodiment.

First, a vehicle front portion structure 10 relating to a first embodiment is described. As shown in FIG. 2, a pair of left and right front side members 12, that are rectangular closed cross-sectional shapes (hollow angular pillar shapes) that extend along the vehicle body longitudinal direction, are disposed at the front portion side of a vehicle at the vehicle body right side and the vehicle body left side so as to be separated from one another by a predetermined interval (only the vehicle body left side is shown in FIG. 2).

An inclined portion (kick portion) 14, that is for causing the vehicle body front portion side to be positioned higher than the vehicle body rear portion side, is formed at the front side member 12. Further, a suspension member 30, that is made of metal (e.g., made of steel) and is described later, is supported at the vehicle body front lower side of the inclined portion 14, i.e., at the vehicle body lower side of the front side member 12 at the vehicle body front portion side that includes the inclined portion 14, in a state of hanging-down from this front side member 12.

In detail, a front side fastened-to portion 16 and a rear side fastened-to portion 18, that are for respectively fastening and fixing a front side fastening portion 36 and a rear side fastening portion 38 that are described later of the suspension member 30, are provided at a vehicle body front portion of the front side member 12 and at a lower end portion of the inclined portion 14. Note that the suspension member 30 is disposed so as to overlap the inclined portion 14 in a side view (the height direction) seen from the vehicle transverse direction and in a plan view (the vehicle transverse direction) (see FIG. 2, FIG. 3).

Figure 4:
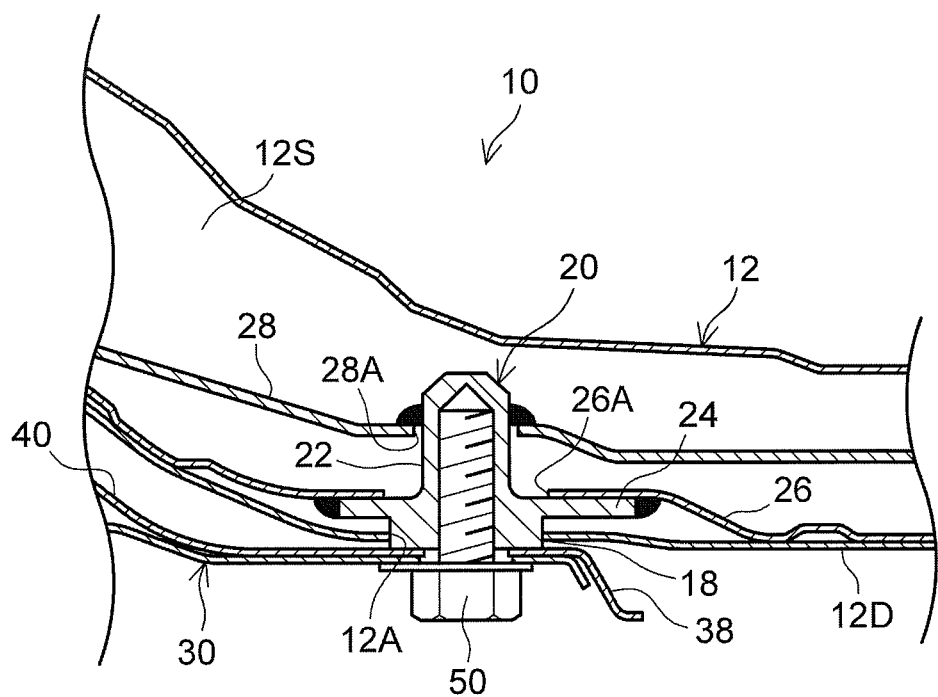
FIG. 4 is a partial, enlarged side sectional view showing main portions of the vehicle front portion structure relating to the first embodiment.

As shown in FIG. 4, a lower reinforcement 26, that extends in the vehicle body longitudinal direction and that is disposed at a lower side position due to the peripheral edge portion being fixed by welding to a side wall 12S of the front side member 12, and an upper reinforcement 28, that extends in the vehicle body longitudinal direction and that is disposed at an upper side position due to the peripheral edge portion being fixed by welding to the side wall 12S of the front side member 12, are provided within the front side member 12 at the rear side fastened-to portion 18. Due thereto, the strength (rigidity) of the rear side fastened-to portion 18 is improved.

Further, through-holes 12A, 26A, 28A, that are circular and are for the inserting-through of a cap portion 22 of a cap nut 20 that is described later, are formed respectively in a lower wall 12D of the front side member 12, the lower reinforcement 26, and the upper reinforcement 28 at the rear side fastened-to portion 18 (the lower end portion of the inclined portion 14).

The cap nut 20 has the cap portion 22 at whose inner peripheral surface a female screw portion is formed, and a flange portion 24 that is annular and that is formed integrally with the outer peripheral surface of the cap portion 22 at the bolt insertion direction upstream side. Further, the height of the cap portion 22 is made to be higher than the interval in the vertical direction from the lower wall 12D to the upper reinforcement 28.

Further, the cap nut 20 is placed due to the cap portion 22, that is further toward the bolt insertion direction upstream side than the flange portion 24, being inserted-through the through-hole 12A of the lower wall 12D before the lower reinforcement 26 and the upper reinforcement 28 are provided. Further, at the time of inserting the cap portion 22 through the interior of the through-hole 26A and providing the lower reinforcement 26, the outer peripheral portion of the flange portion 24 is fixed to the lower reinforcement 26 by arc welding.

Still further, at the time of inserting the cap portion 22 through the interior of the through-hole 28A and providing the upper reinforcement 28, the outer peripheral surface of the cap portion 22 is fixed to the upper reinforcement 28 by arc welding. Due thereto, the cap nut 20 is fixed securely to the rear side fastened-to portion 18 (the lower reinforcement 26 and the upper reinforcement 28) of the front side member 12.

Figure 3:
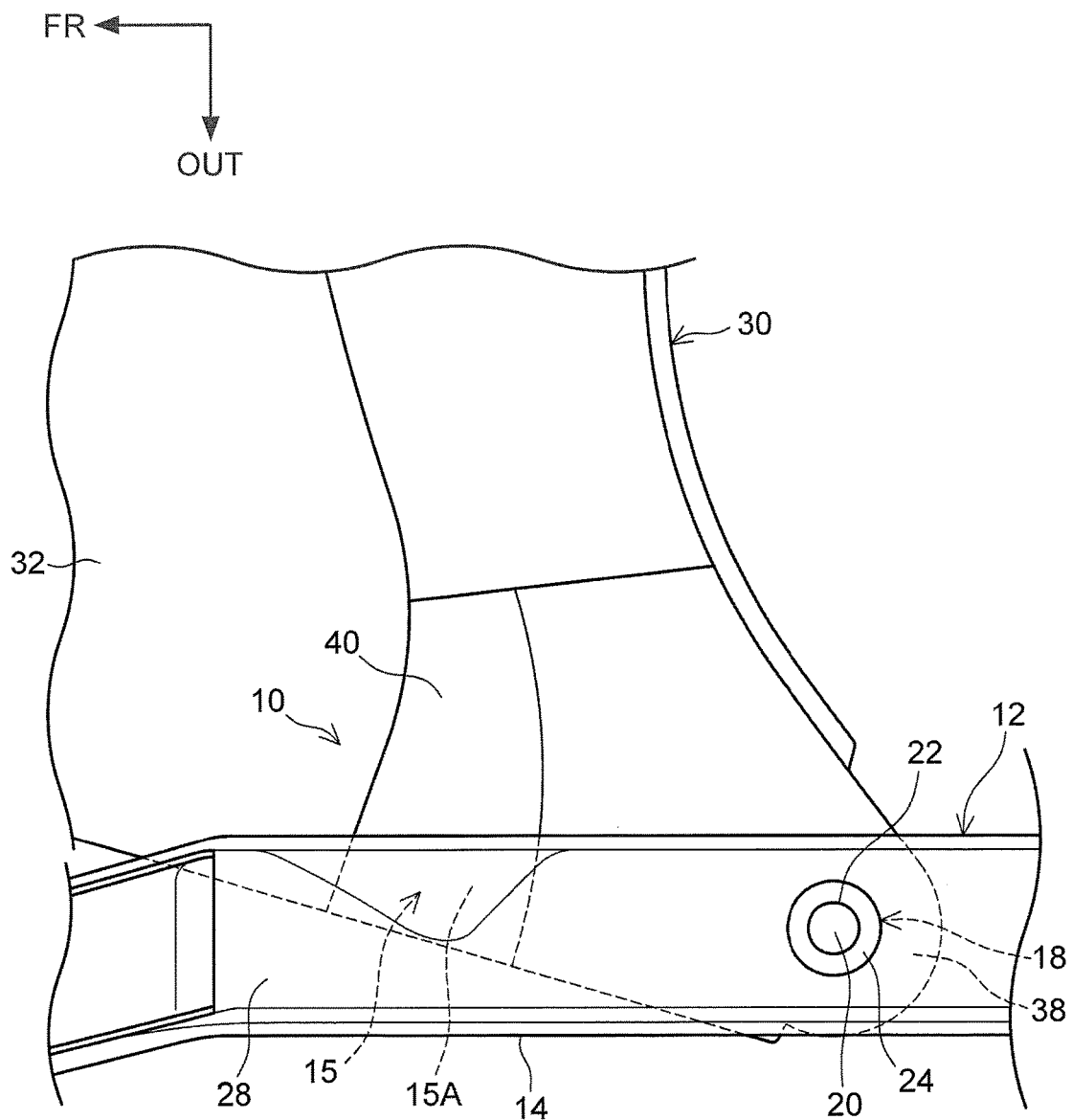
FIG. 3 is a partial, enlarged plan view showing main portions of the vehicle front portion structure relating to the first embodiment.

Further, as shown in FIG. 2 and FIG. 3, a concave portion 15, that has an inclined surface 15A that heads toward the vehicle body front upper side, is formed at the lower surface side and the vehicle transverse direction inner side of the inclined portion 14. In a side view seen from the vehicle transverse direction, the angle of inclination of the inclined surface 15A (the inclined portion 14) is made to be larger than the angle of inclination of an inclined wall 40, that is described later, of the suspension member 30. In other words, in a side view seen from the vehicle transverse direction, the angle of inclination of the inclined wall 40 of the suspension member 30 is made to be smaller than the angle of inclination of the inclined surface 15A (the inclined portion 14) of the concave portion 15.

Figure 1:
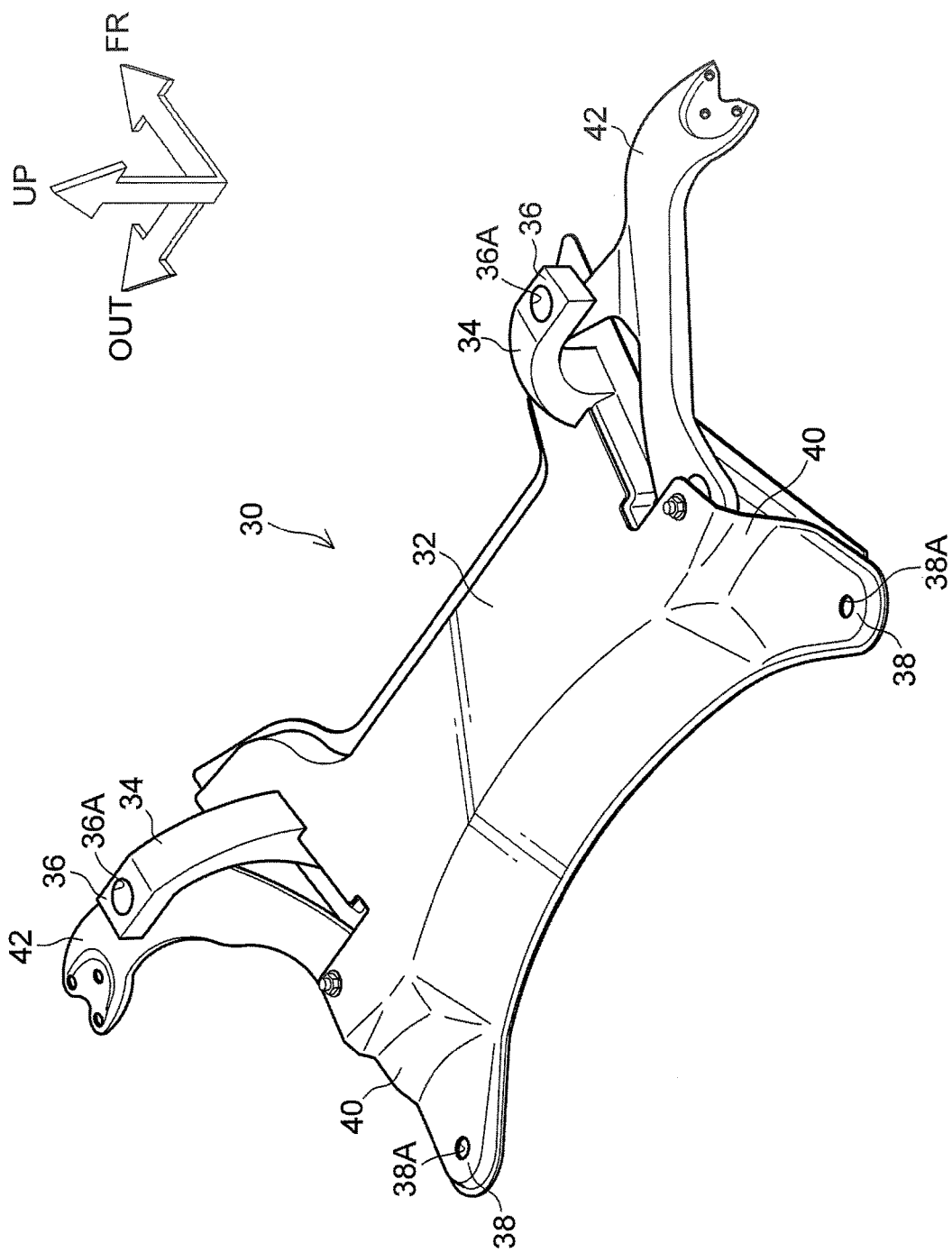
FIG. 1 is a perspective view of a suspension member that structures a vehicle front portion structure relating to a first embodiment.

As shown in FIG. 1, the suspension member 30 has a suspension member main body 32, a pair of corner portions 34 that project so as to extend toward the vehicle body upper outer sides at the front portion sides of the vehicle transverse direction both sides of the suspension member main body 32, the inclined walls 40 that are formed at the rear portion sides of the vehicle transverse direction both sides of the suspension member main body 32 at angles of inclination heading toward the vehicle body lower rear side (the vehicle body upper front side), and the rear side fastening portions 38 that serve as fastening portions that are formed integrally with the rear end portions of the inclined walls 40 so as to extend toward the vehicle body rear side.

Note that lower arms 42 that structure an unillustrated suspension are mounted to the suspension member main body 32, further toward the vehicle transverse direction outer sides than the corner portions 34. Further, an unillustrated power unit, that includes an engine and a transmission, is disposed at the vehicle body front side of the suspension member 30.

As shown in FIG. 1 and FIG. 2, the upper end portions of the corner portions 34 are made to be the front side fastening portions 36 in which are formed through-holes 36A through which connecting members 44 that are tubular are inserted. The front side fastening portions 36 are fastened and fixed to the front side fastened-to portions 16 of the front side members 12, via the connecting members 44 and by bolts 50 and nuts 48.

The rear side fastening portion 38 is formed substantially in the shape of a flat plate that is reinforced due to the peripheral edge portion being molded so as to bend toward the vehicle body lower side. The through-hole 38A, that is for insertion-through of the bolt 50 (see FIG. 4), is formed at the rear end portion side of the rear side fastening portion 38. Due to the bolt 50 being inserted-through the through-hole 38A from the vehicle body lower side and being screwed-together with the cap nut 20 that is fixed to the rear side fastened-to portion 18 of the front side member 12, the rear side fastening portion 38 is securely fastened and fixed to the rear side fastened-to portion 18.

The inclined wall 40 is formed at the portion of the suspension member main body 32 that is at the vehicle body front side of the rear side fastening portion 38, i.e., a region that is adjacent to and faces the inclined surface 15A (the inclined portion 14) of the concave portion 15 in the vehicle body longitudinal direction when the suspension member 30 is mounted to the front side member 12. In a side view (cross-sectional view) seen from the vehicle transverse direction, the angle of inclination of the inclined wall 40 is made to be smaller than the angle of inclination of the inclined surface 15A (the inclined portion 14) of the concave portion 15.

In other words, as shown in FIG. 2, in a side view seen from the vehicle transverse direction, the formation position of this inclined surface 15A (the concave portion 15) is set such that a virtual straight line K2 that runs along the inclined surface 15A (i.e., whose angle of inclination is greater than a virtual straight line K1) passes through an intersection point P of the virtual straight line K1 that runs along the inclined wall 40 and a virtual horizontal plane L that runs along the rear side fastening portion 38.

Note that this intersection point P is at the front end portion of the rear side fastening portion 38 (the rear end portion of the inclined wall 40), and, at the time of a full-overlap frontal collision, becomes the starting point of the bending deformation of the rear side fastening portion 38 toward the vehicle body lower side. Further, as shown in FIG. 3, the inclined surface 15A (the concave portion 15) is formed up to a range that goes past, toward the vehicle body front side and the vehicle body rear side respectively, the front end portion and the rear end portion of the inclined wall 40 that overlaps the inclined portion 14 as seen in plan view.

Operation of the vehicle front portion structure 10 relating to the first embodiment, that is structured as described above, is described next mainly on the basis of FIG. 5 and FIG. 6.

When the vehicle is involved in a full-overlap frontal collision, the power unit moves toward the vehicle body rear side (moves rearward), and some of this collision load is inputted to the suspension member main body 32 of the suspension member 30. Thereupon, the suspension member main body 32 moves toward the vehicle body rear side (moves rearward). Here, in a side view seen from the vehicle transverse direction, the angle of inclination of the inclined wall 40 is made to be smaller than the angle of inclination of the inclined portion 14 (the inclined surface 15A of the concave portion 15).

Figure 5:
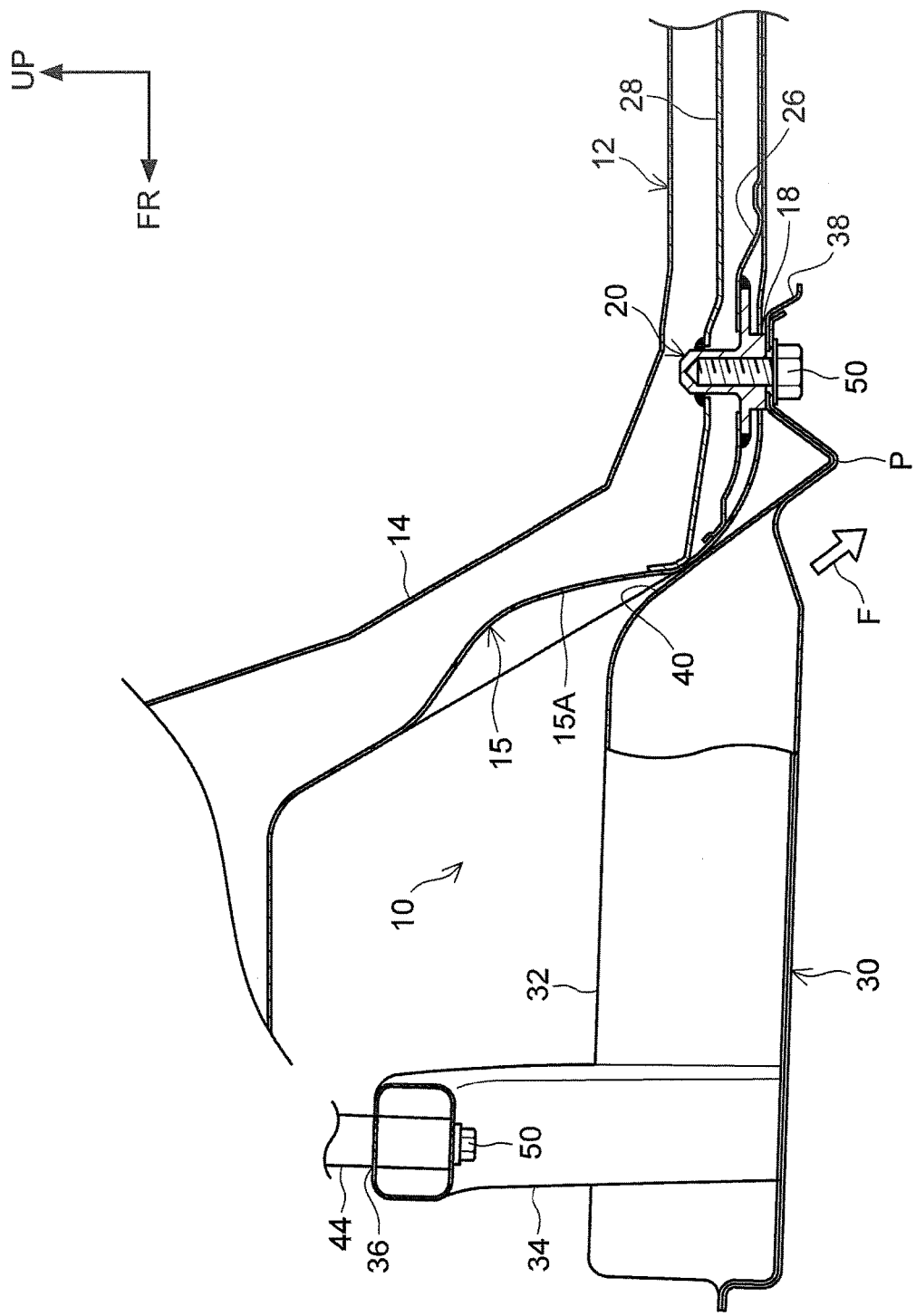
FIG. 5 is a side sectional view showing the state immediately after a full-overlap frontal collision, of the vehicle front portion structure relating to the first embodiment.

Accordingly, as shown in FIG. 5, when the suspension member main body 32 moves rearward, the inclined wall 40 contacts the inclined portion 14 (the inclined surface 15A), and moves toward the vehicle body rear lower side while being guided by this inclined portion 14 (inclined surface 15A) (shown by arrow F in FIG. 5). Namely, the suspension member main body 32 is displaced toward the intersection point P.

Here, the rear side fastening portion 38 is formed substantially in the shape of a plate. Accordingly, the rear side fastening portion 38 bendingly deforms toward the vehicle body lower side with the intersection point P being the starting point. Note that, at this time, because the suspension member main body 32 is displaced rectilinearly toward the intersection point P, there is no loss of the input of load toward the intersection point P, and bending deformation can be brought about at the rear side fastening portion 38 at an early stage by input of a low load.

Figure 6:
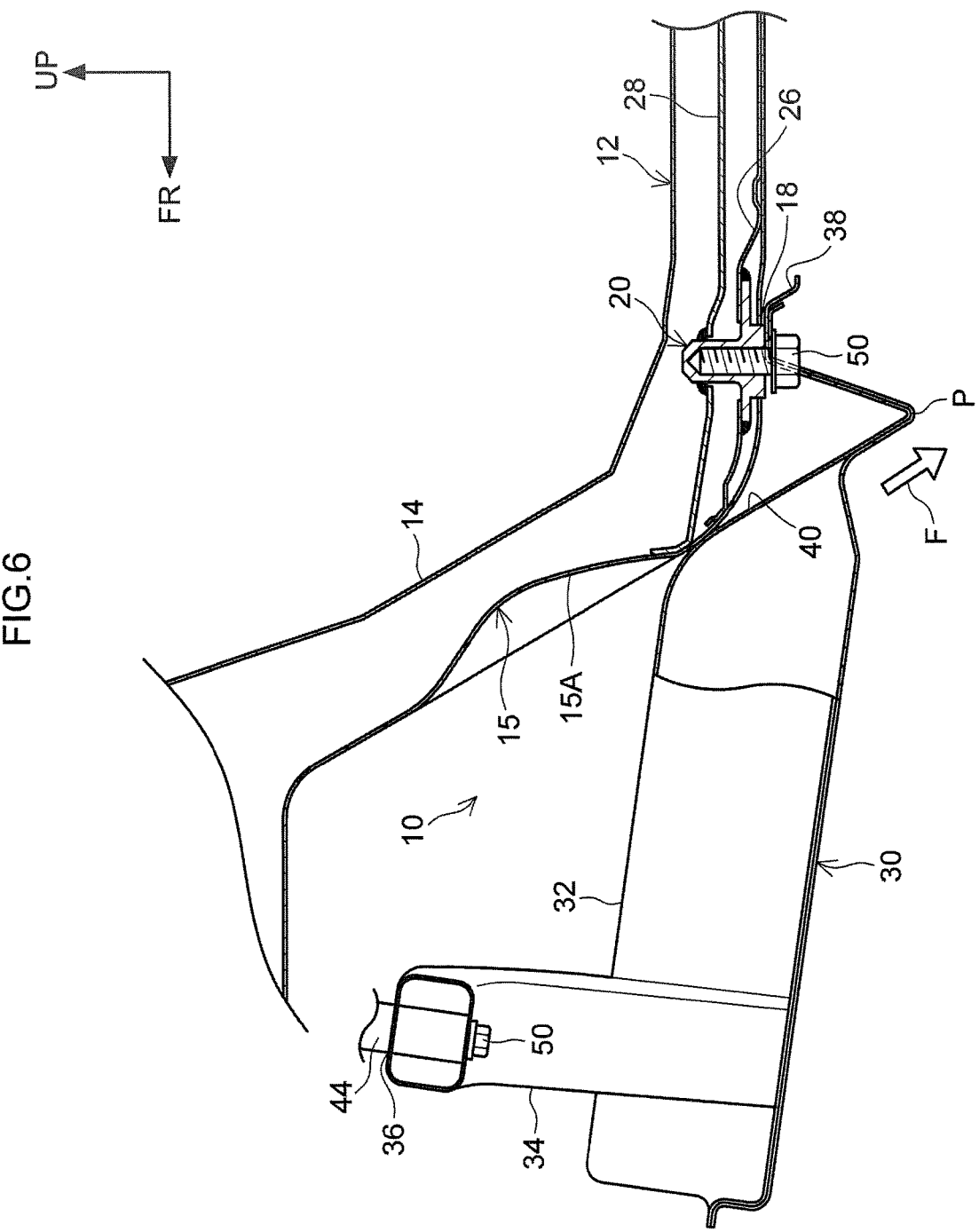
FIG. 6 is a side sectional view showing the state after a full-overlap frontal collision, of the vehicle front portion structure relating to the first embodiment.

Further, as shown in FIG. 6, when the bending deformation of the rear side fastening portion 38 progresses, movement of the suspension member main body 32 toward the vehicle body rear lower side progresses (shown by arrow F in FIG. 6). Here, the cap nut 20, with which the bolt 50 is screwed-together, is securely fixed to the rear side fastened-to portion 18, and the fastening strength of the rear side fastening portion 38 to the rear side fastened-to portion 18 is high.

Accordingly, when the bending deformation of the rear side fastening portion 38 progresses, load toward the vehicle body lower side (like a corkscrew) is applied (stress concentrates) around the through-hole 38A of this rear side fastening portion 38, and the periphery of this through-hole 38A breaks. Namely, the rear side fastening portion 38 is made to separate from the rear side fastened-to portion 18 (the fastened state of the rear side fastening portion 38 to the rear side fastened-to portion 18 is cancelled).

Due thereto, the suspension member main body 32 (the suspension member 30) is moved so as to deeply enter in toward the vehicle body lower side of the front side member 12, while interference with the inclined portion 14 is suppressed (mitigated). Accordingly, the collision load, that is inputted to the suspension member 30 from the vehicle body front side, can be absorbed (released) efficiently.

Further, the rear side fastening portion 38 extends integrally toward the vehicle body rear side from the rear end portion of the inclined wall 40 of the suspension member 30. Accordingly, as compared with a structure in which the rear side fastening portion 38 is provided separately from the suspension member 30, assembling of the suspension member 30 is easy, and a reduction in manufacturing costs can be devised. Namely, an increase in the number of parts and an increase in the manufacturing costs at the time of manufacturing the suspension member 30 can be suppressed or prevented.

Second Embodiment

The vehicle front portion structure 10 relating to the second embodiment is described next. Note that regions that are equivalent to those of the above-described first embodiment are denoted by the same reference numerals, and detailed description thereof (including the operation) is omitted as appropriate.

Figure 7:
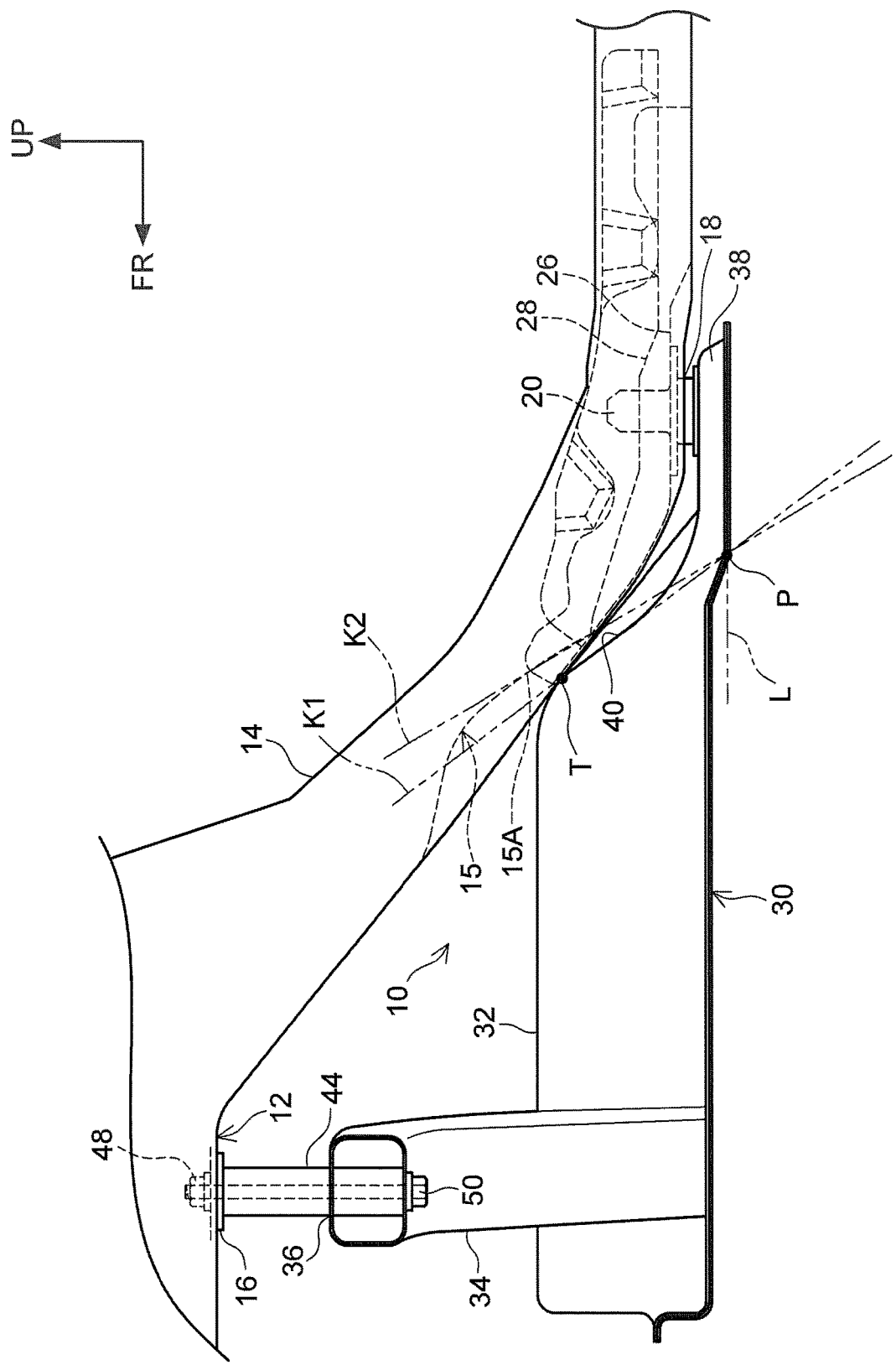
FIG. 7 is a side view showing a vehicle front portion structure relating to a second embodiment.

As shown in FIG. 7, in the vehicle front portion structure 10 relating to this second embodiment, the angle of inclination of the inclined wall 40 of the suspension member 30 is made to be the same as or greater than the angle of inclination of the inclined portion 14. Namely, the angle of inclination of the inclined wall 40 relating to this second embodiment is made to be smaller than the angle of inclination of the inclined surface 15A of the concave portion 15 that is formed at least at the lower surface side and the vehicle transverse direction inner side of the inclined portion 14 of the front side member 12.

Note that the inclined surface 15A (the concave portion 15) is formed at the front end portion side of the inclined wall 40 that overlaps the inclined portion 14 in plan view, and up to a range that goes past, toward the vehicle body rear side, a proximate point T in a side view seen from the vehicle transverse direction, so as to cover the proximate point T that the inclined portion 14 is nearest to. In the case of the second embodiment that has such a structure, operation and effects that are equivalent to those of the above-described first embodiment are obtained.

Namely, when the vehicle is involved in a full-overlap frontal collision, the power unit moves toward the vehicle body rear side (moves rearward), and some of this collision load is inputted to the suspension member main body 32 of the suspension member 30. Thereupon, the suspension member main body 32 moves toward the vehicle body rear side (moves rearward).

Figure 8:
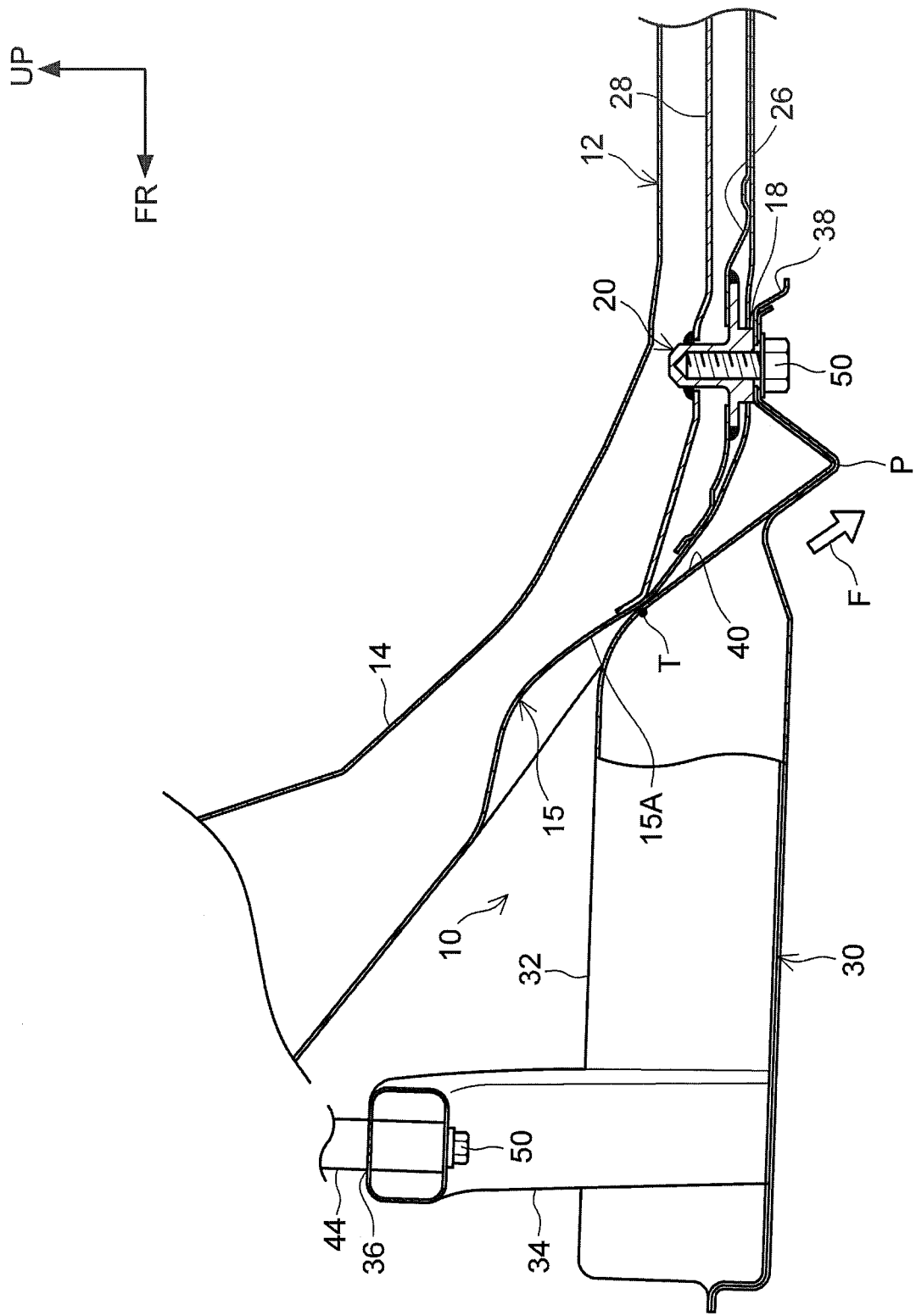
FIG. 8 is a side sectional view showing the state immediately after a full-overlap frontal collision, of the vehicle front portion structure relating to the second embodiment.

Here, in a side view seen from the vehicle transverse direction, the angle of inclination of the inclined wall 40 is made to be smaller than the angle of inclination of the inclined surface 15A of the concave portion 15. Accordingly, as shown in FIG. 8, when the suspension member main body 32 moves rearward, the front end portion side of the inclined wall 40 (including the proximate point T) contacts the inclined surface 15A, and moves toward the vehicle body rear lower side while being guided by this inclined surface 15A (shown by arrow F in FIG. 8).

Figure 9:
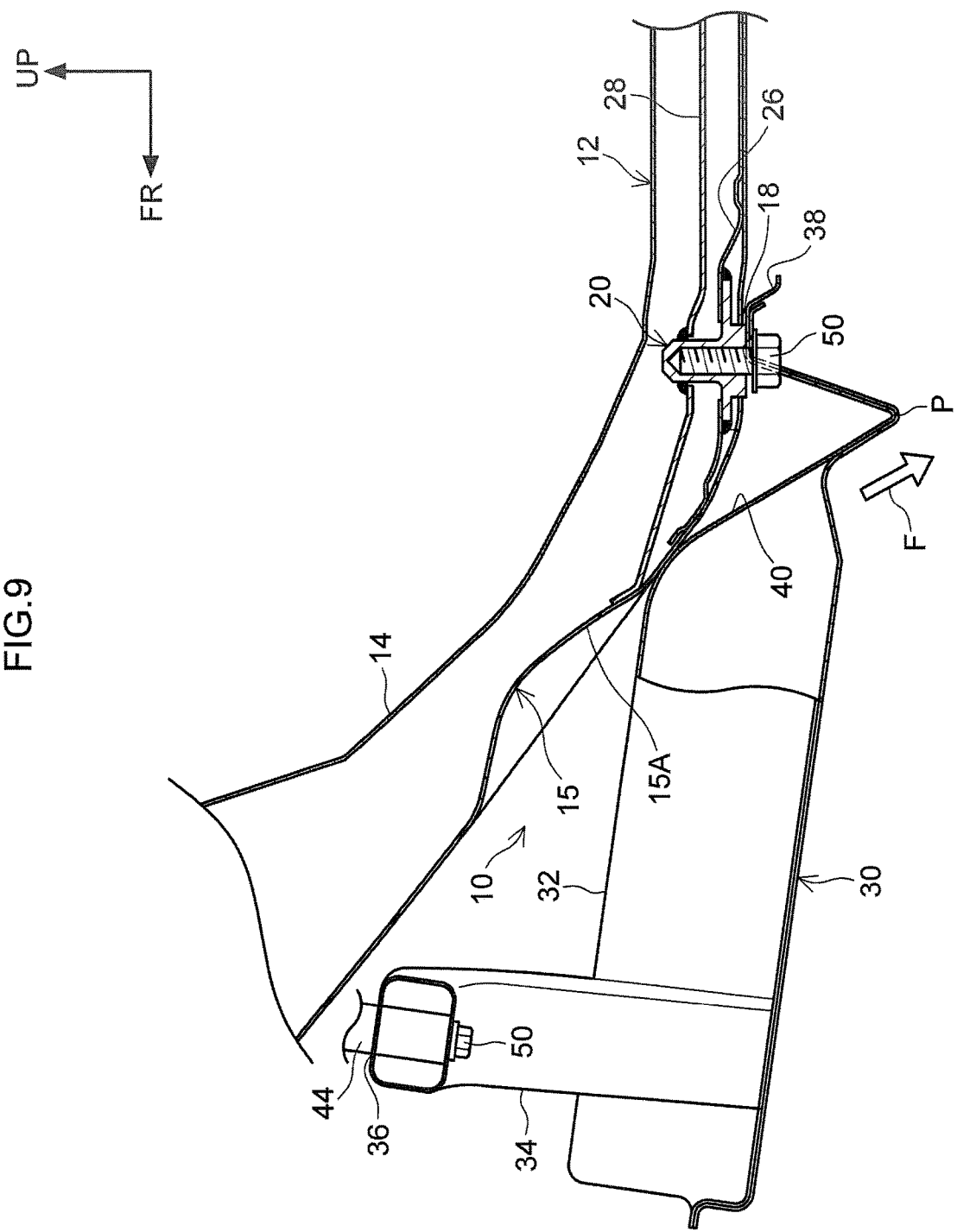
FIG. 9 is a side sectional view showing the state after a full-overlap frontal collision, of the vehicle front portion structure relating to the second embodiment.

Namely, the suspension member main body 32 is displaced toward the intersection point P, and due thereto, the rear side fastening portion 38 is bendingly deformed toward the vehicle body lower side with the intersection point P being the starting point. Then, as shown in FIG. 9, when the bending deformation of the rear side fastening portion 38 progresses, the movement of the suspension member main body 32 toward the vehicle body rear lower side progresses (shown by arrow F in FIG. 9), and the rear side fastening portion 38 separates from the rear side fastened-to portion 18.

Due thereto, the suspension member main body 32 (the suspension member 30) is moved so as to deeply enter in toward the vehicle body lower side of the front side member 12, while interference with the inclined portion 14 is suppressed (mitigated). Accordingly, the collision load, that is inputted to the suspension member 30 from the vehicle body front side, can be absorbed (released) efficiently.

Although the vehicle front portion structure 10 relating to the present embodiment has been described above on the basis of the drawings, the vehicle front portion structure 10 relating to the present embodiment is not limited to the illustrated structure, and the design thereof can be changed appropriately within a scope that does not depart from the gist of the present invention. For example, the concave portion 15 (the inclined surface 15A) does not have to be formed at the inclined portion 14. Further, the structure of increasing the fastening strength of the rear side fastening portion 38 to the rear side fastened-to portion 18 is not limited to the structure that includes the cap nut 20.

Further, the disclosure of Japanese Patent Application No. 2013-81390 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A vehicle front portion structure comprising:
a pair of front side members disposed along a vehicle body longitudinal direction, each of the pair of front side members having an inclined portion that arranges a vehicle body front portion side of each of the pair of front side members to be positioned higher than a vehicle body rear portion side of each of the pair of front side members in a vertical direction of the vehicle body;
a suspension member disposed at a vehicle body front side of the inclined portions, the suspension member including a plurality of inclined walls having an angle of inclination that is smaller than an angle of inclination of the inclined portions, the plurality of inclined walls being formed in regions of the suspension member that face the inclined portions of the pair of front side members at a vehicle body rear portion side of the suspension member, in a side view seen from a vehicle transverse direction; and
a plurality of concave portions formed in lower surface sides of the inclined portions of the pair of front side members, the plurality of concave portions each having an inclined surface facing a vehicle body front upper side, and an angle of inclination of the inclined surfaces being larger than the angle of inclination of the plurality of inclined walls, in the side view seen from the vehicle transverse direction.

2. A vehicle front portion structure comprising:
a pair of front side members disposed along a vehicle body longitudinal direction, each of the pair of front side members having an inclined portion that arranges a vehicle body front portion side of each of the pair of front side members to be positioned higher than a vehicle body rear portion side of each of the pair of front side members in a vertical direction of the vehicle body;
a plurality of concave portions formed in lower surface sides of the inclined portions of the pair of front side members, the plurality of concave portions each having an inclined surface facing a vehicle body front upper side; and
a suspension member disposed at a vehicle body front side of the inclined portions, the suspension member including a plurality of inclined walls having an angle of inclination that is smaller than an angle of inclination of the inclined surfaces of the plurality of concave portions, the plurality of inclined walls being formed in regions of the suspension member at a vehicle body rear portion side of the suspension member that face the inclined surfaces of the plurality of concave portions, in a side view seen from a vehicle transverse direction.

3. The vehicle front portion structure of claim 1, wherein the suspension member has a plurality of fastening portions that extend integrally from rear end portions of the plurality of inclined walls toward a vehicle body rear side, the plurality of fastening portions being fastened to lower end portions of the inclined portions.

4. The vehicle front portion structure of claim 3, wherein the plurality of fastening portions are formed in flat plate shapes that are configured to bendingly deform toward a vehicle body lower side based on a collision load inputted from a vehicle body front side.

5. The vehicle front portion structure of claim 3, wherein:
a plurality of cap nuts are fixed to the lower end portions of the inclined portions; and
the plurality of fastening portions are fastened to the lower end portions by bolts that are inserted through through-holes formed in the plurality of fastening portions, the plurality of fastening portions being fastened to the lower end portions by the bolts being screwed-together with the cap nuts.

6. The vehicle front portion structure of claim 2, wherein the suspension member has a plurality of fastening portions that extend integrally from rear end portions of the plurality of inclined walls toward a vehicle body rear side, and the plurality of fastening portions being fastened to lower end portions of the inclined portions.

7. The vehicle front portion structure of claim 6, wherein the plurality of fastening portions are formed in flat plate shapes that are configured to bendingly deform toward a vehicle body lower side based on a collision load inputted from a vehicle body front side.

8. The vehicle front portion structure of claim 6, wherein:
a plurality of cap nuts are fixed to the lower end portions of the inclined portions and
the plurality of fastening portions are fastened to the lower end portions by bolts that are inserted through through-holes formed in the plurality of fastening portions, the plurality of fastening portions being fastened to the lower end portions by the bolts being screwed-together with the cap nuts.

* * * * *